(12) United States Patent
Budnik et al.

(10) Patent No.: US 8,527,813 B2
(45) Date of Patent: Sep. 3, 2013

(54) DYNAMIC REPRIORITIZATION OF TEST CASES DURING TEST EXECUTION

(75) Inventors: Christof Budnik, Lawrenceville, NJ (US); Rajesh Subramanyan, Rocklin, CA (US)

(73) Assignee: Siemens Aktiengesellschaft, Munich (DE)

( * ) Notice: Subject to any disclaimer, the term of this patent is extended or adjusted under 35 U.S.C. 154(b) by 149 days.

(21) Appl. No.: 13/329,447

(22) Filed: Dec. 19, 2011

(65) Prior Publication Data

US 2013/0159774 A1    Jun. 20, 2013

(51) Int. Cl.
*G06F 11/00*        (2006.01)

(52) U.S. Cl.
USPC ................. 714/32; 714/25; 714/33; 714/47.1

(58) Field of Classification Search
USPC ........................... 714/25, 32, 33, 37, 46, 47.1
See application file for complete search history.

(56) References Cited

U.S. PATENT DOCUMENTS

| | | | |
|---|---|---|---|
| 2005/0015667 A1* | 1/2005 | Aaron | 714/25 |
| 2008/0126858 A1* | 5/2008 | Barras | 714/25 |
| 2009/0199045 A1* | 8/2009 | Kasubuchi et al. | 714/38 |
| 2009/0287958 A1* | 11/2009 | Bhatt et al. | 714/26 |
| 2009/0319829 A1* | 12/2009 | Takayama | 714/32 |

* cited by examiner

*Primary Examiner* — Sarai Butler

(57) ABSTRACT

Systems and methods are described that dynamically reprioritize test cases for Model-Based Testing (MBT) during test execution. Test case execution is prioritized according to their potential to detect uncovered failures within a design model.

16 Claims, 8 Drawing Sheets

DYNAMIC REPRIORITIZATION OF TEST CASES DURING TEST EXECUTION

BACKGROUND OF THE INVENTION

The invention relates generally to software testing. More specifically, the invention relates to methods and systems that dynamically reprioritize test cases used in Model-Based Testing (MBT) during test execution.

Model-Based Testing (MBT) is the application of Model-Based Design (MBD) for designing and executing the necessary test artifacts such as test cases and test scripts to perform software testing. A test model is used that describes all aspects of test data needed for testing such as test inputs, expected outputs and test execution environment. The test model is typically derived from a design model that describes aspects of a System Under Test (SUT). A wide range of test generation methods have been developed and are currently provided by many test generation tools supporting the MBT approach.

The number of test cases generated depends on two factors: 1) the method to be selected, and 2) the underlying design model. The design model is an architectural artifact that describes the detailed design of a system using diagrams such as workflow diagrams. While the first factor is selected by a tester, the second factor can not be influenced by the tester. The selected method is a test case generation algorithm that depends on different criteria on how to derive test cases. For example, the criteria may cover all test input variations within the design model or cover all activities within the design model. Accordingly, the test case generation algorithm generates test cases that either fulfills the test input or the activity coverage criteria. Since time allocated for testing is limited, only a finite number of test cases may be executed.

The selection of the right method is important to achieve an appropriate coverage of the underlying architecture to fulfill a certain quality attribute. Therefore, the order in which the test cases are executed is very important to reveal as many defects as possible in the given period of time. The underlying architecture is how the codes or methods and how the features or components are structured for a system test.

The objective of a test case is to fail during execution and thereby indicate that a potential illegal behavior of the system was uncovered. However, test cases that fail during a test run that do not result from different causes may reveal the same defect. Within a test run a collection of test cases is planned to be executed against a specific version of the SUT.

Current test case prioritization approaches do not consider the dependency between test cases during execution. Most approaches prioritize regression test cases where the objective is to retest a system or component to verify that modifications previously performed have not caused unintended effects. These approaches do not provide dynamic reprioritization during test case execution.

What is desired is a test case prioritization method that reorders test case execution towards their potential to cover divergent defects within a system dynamically during a test run.

SUMMARY OF THE INVENTION

The inventors have discovered that it would be desirable to have a method and system that dynamically reprioritizes test cases used in MBT during test execution.

Test case prioritization is a technique where an order of test cases is executed to provide a failure in a design model as early as possible. It is applied in the scenario where adequate time for testing is not available. One performance goal is fault detection capacity, i.e., how many divergent faults are detected. Therefore, test cases have to be prioritized according to their potential to detect uncovered failures within the design model.

Starting with an initial test case set that is generated based on the architectural artifacts of the SUT, embodiments automatically reprioritize unexecuted test cases based upon their dependency with a test case that failed during test execution to improve the likelihood of detecting divergent failures as early as possible, i.e., the next test case to be executed has the greatest distance from the failed test case(s).

One aspect of the invention provides a method for dynamically reprioritizing unexecuted test cases in a test case set for a Model-Based Testing (MET) System Under Test (SUT) design model during test case execution. Methods according to this aspect of the invention include inputting a design model representing the SUT as an event-flow, analyzing the design model structure in terms of possible event-flows considering the design model's control and data elements, computing test complexity for the coverage of the event-flows and control and data elements, selecting test case generation criteria for a desired test objective, generating a plurality of test cases based on the test case selection criteria wherein each test case is an event sequence, computing test case capability for the coverage of event-flows and data wherein the more data and flows each test case tests, the greater their capability is to detect faults, weighting identified test data towards their coverage for selection, prioritizing the test cases based on the test selection criteria and the weighting of test data, executing the test cases in their priority against the model, detecting if a test case failed during execution, calculating a distance between a failed test case and each remaining test case to be executed, and based on the distance calculation for each unexecuted test case, executing the test case having the greatest distance.

Another aspect of the invention is wherein calculating the distance between a failed test case and each remaining test case to be executed further comprises parsing the failed test case event sequence length k into a plurality of event sequences having an event sequence length seqlen from 2 to the failed test case event sequence length k, wherein the parsed event sequences comprise the failed test case event sequences in their original order, comparing each failed test case parsed event sequence with each remaining unexecuted test case event sequence, identifying if a failed test case parsed event sequence is present in any of the unexecuted test cases, and for each unexecuted test case, summing the number of failed test case parsed event sequence matches as a distance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
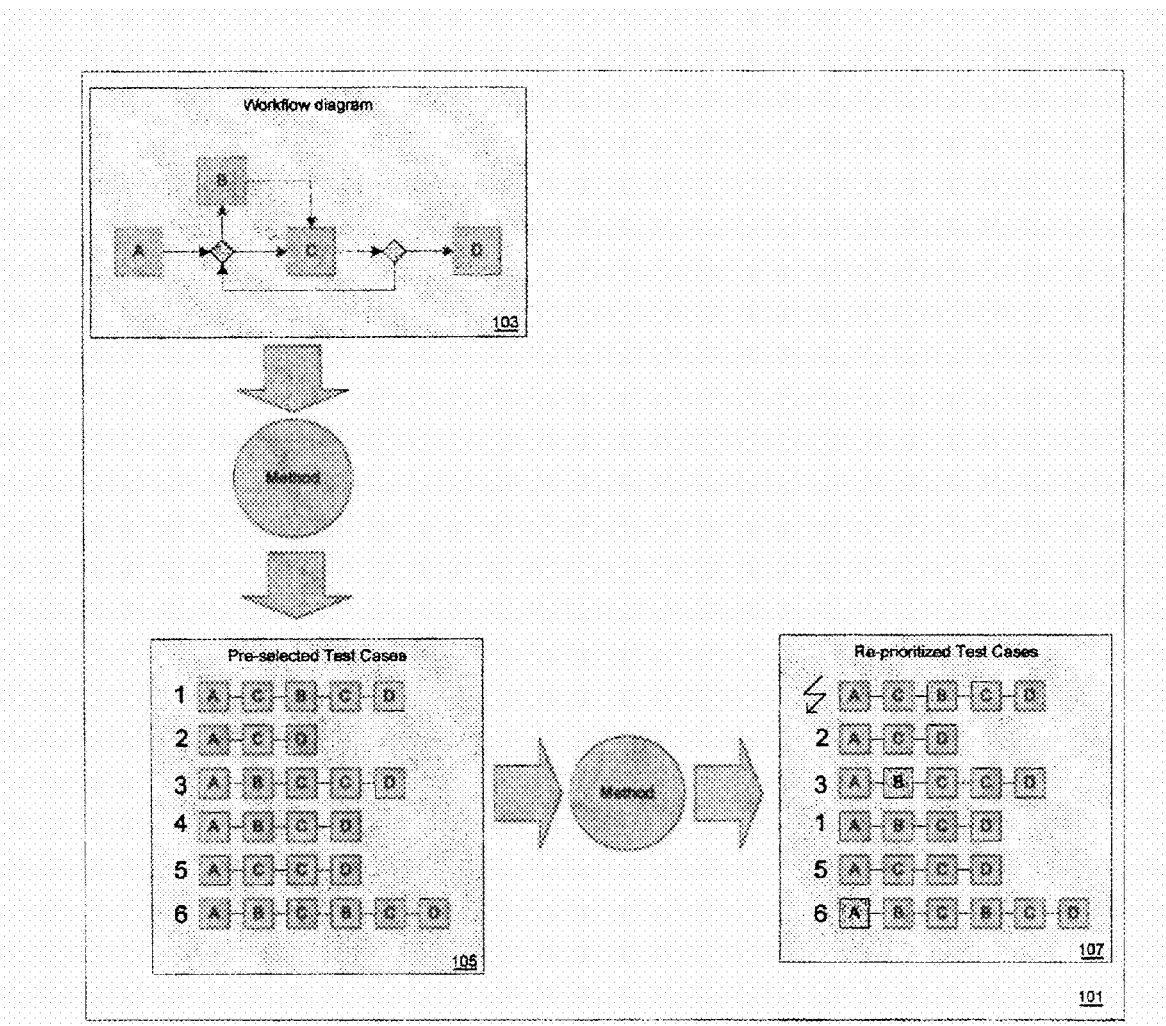
FIG. 1 is an exemplary system overview.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that dynamically reprioritize unexecuted test cases in a test case set for an MBT design model. The invention is a modular framework and is deployed as software as an application program tangibly embodied on a program storage device. The application code for execution can reside on a plurality of different types of computer readable media known to those skilled in the art.

Embodiments reprioritize unexecuted test cases in a test case set based on the results gained from an executed test case that failed. Static analysis methods are used to determine an initial set of test cases. The test cases reflect the architecture artifacts of the SUT in terms of its design. The design model may be represented by Unified Modeling Language 2 (UML 2) activity diagrams augmented with stereotyped notes for test case generation purposes. UML activity diagrams are used for event-flow modeling.

A set of test cases are input for test execution and are the factor that determines test execution time. The time depends on the number of test cases to be executed as well as each test case length. A test case length is defined by the number of test steps which represents a single operation by a human tester or an automated test system. A test case can fail either because of a defect that was found within the design model, a defect within the test case that prevents the design model from complete execution, or a defect within the test environment the test case is executed. A test environment comprises any required software, hardware and simulator the test case is executed upon.

A defect is a flaw in a component or system that may cause the component or system to fail to perform its required function, i.e., an incorrect statement or data definition. A defect, if encountered during execution may cause a failure of the component or system. In both cases, no advantage is taken from the information gained to reprioritize the remaining test cases to be executed. For efficient test execution, embodiments reprioritize unexecuted test cases in a test case set based on the results of an earlier failed test case. The remaining, reprioritized order of test cases increases their potential to reveal divergent, additional defects within the design model.

FIG. 1 shows an embodiment 101 that transforms a design model 103 that has four events A, B, C, D that describe an SUT into an initial set of test cases $\{1,2,3,4,5,6\}$ 105 that consider the design model's 103 structure and define which event can be followed by another event. An event is an occurrence of significance to a system or software program. Each test case, for example test case 1, comprises a sequence of events A→C→B→C→D that traverses the model. The structure within a model-based specification is statically analyzed to identify control and data flows that are used to select an initial set of test cases.

Embodiments add specific metrics during a static analysis such as the number of control elements and data elements within the design model as well as a calculation of their cyclomatic complexity. The cyclomatic complexity is a software metric that determines the number of independent paths through a design model.

A set of test cases is initially prioritized $\{1,2,3,4,5,6\}$ 105 depending on an applied metric. For example, if the metric is the number of control elements applied, the test cases are initially ordered by how many control elements they cover. The initial prioritized test case set 105 is executed against the design model. Once one of the test cases in the test case set fails (A→C→B→C→D), the remaining, unexecuted test cases are dynamically reprioritized $\{1(4),2,3,5,6\}$ 107 based on a dependency analysis of the failed test case.

Figure 2:
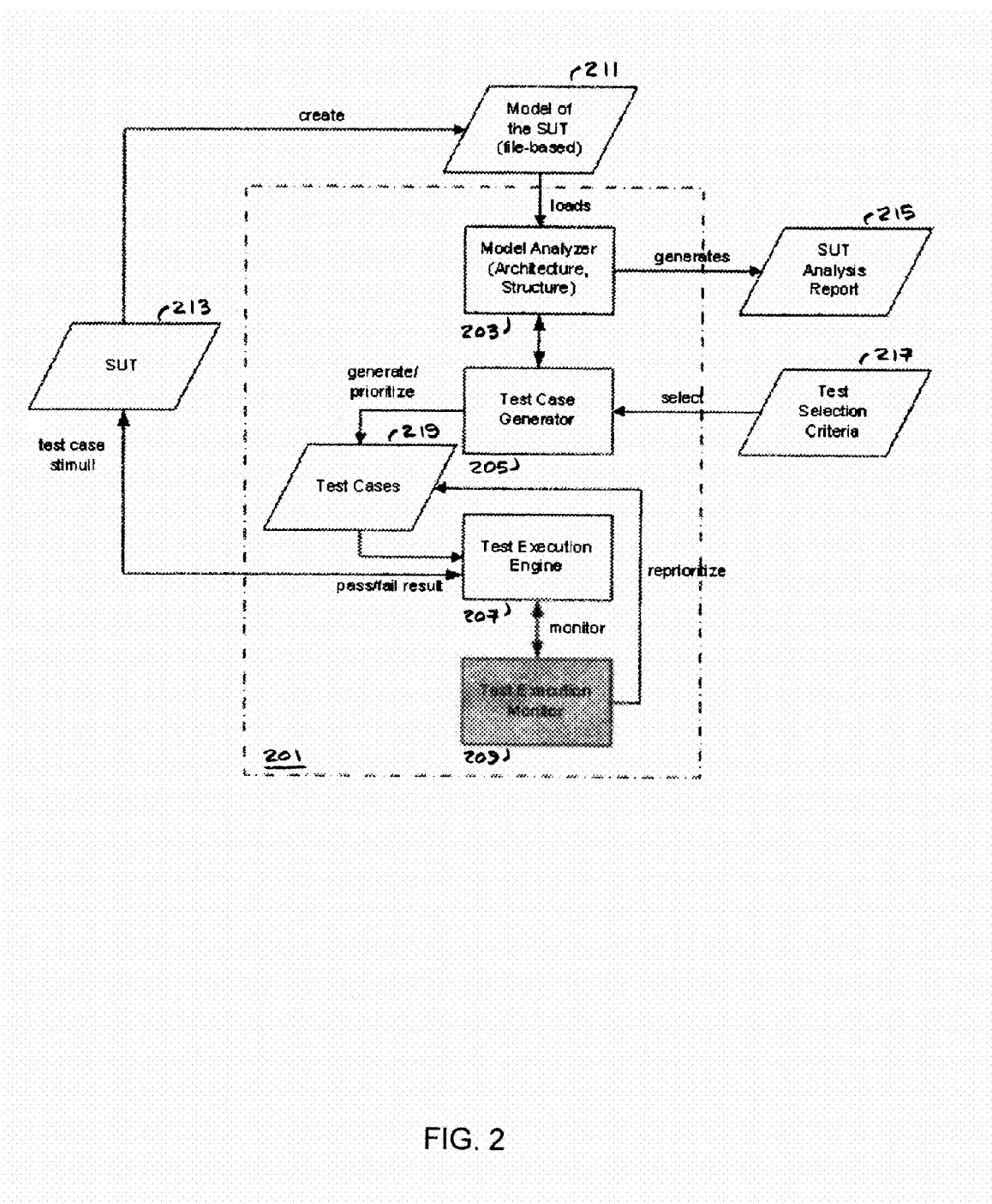
FIG. 2 is an exemplary system framework.
Figure 3A:
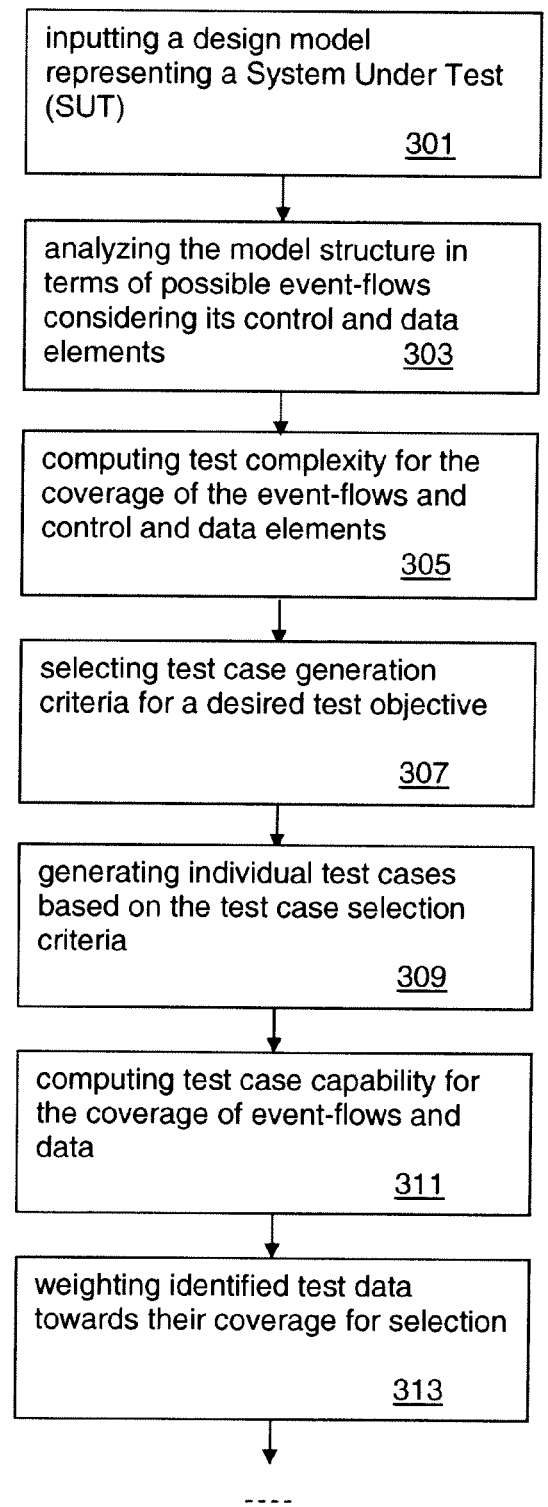
FIG. 3 is an exemplary method.
Figure 3B:
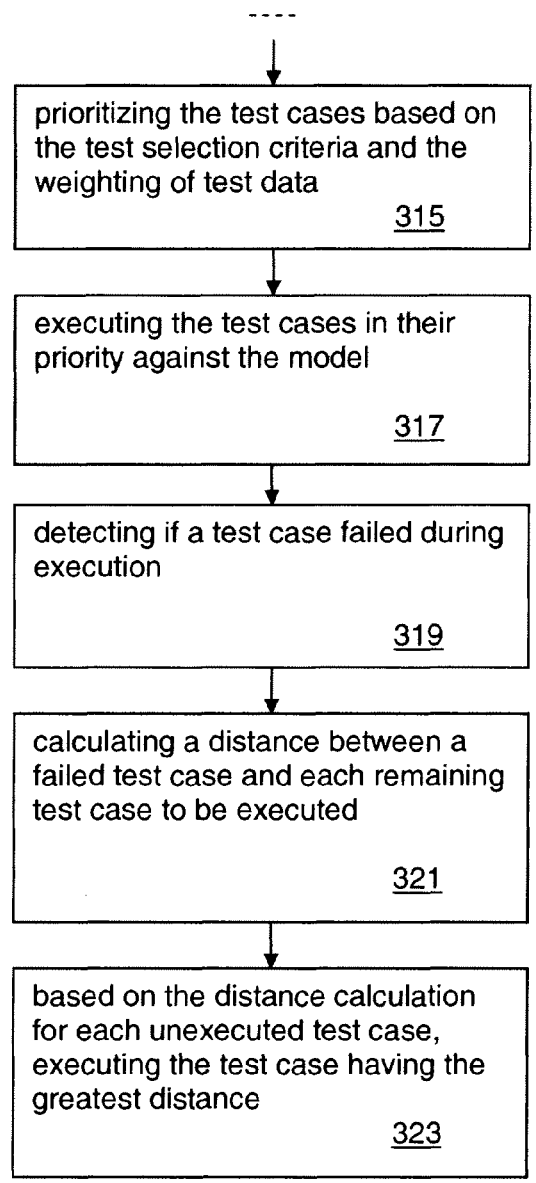

FIG. 2 shows an embodiment of a system framework 201 and FIG. 3 shows a method. The framework 201 includes a model analyzer 203, a test case generator 205, a test case execution engine 207 and a test execution monitor 209. The framework 201 may be implemented as a computer that includes a processor, memory, storage devices, software and I/O. The processor controls the overall operation of the computer by executing instructions defining the configuration. The instructions may be stored in the storage device, for example, an optical or magnetic disk, and loaded into the memory when executing the configuration. Embodiments may be implemented as an application defined by the computer program instructions stored in the memory and/or storage and controlled by the processor executing the computer program instructions. The I/O allows for user interaction with the computer via peripheral devices such as a display, a keyboard, a pointing device, and others.

To create a design model 211 for an SUT 213, the user may use the specification, represented by a system model and additional information such as manuals, or other descriptions of the SUT 213 functionality. This is a standard process used in MBT. The user augments the model 211 with test artifacts that describe the input data variations and expected behavior to be used for deriving test cases, but augmentation may already be performed when the design model is given as a test model input from previous test activities. Event-flow diagrams 103 contain nodes which graphically represent an event and node connections may be used for the model representation 211 and formatted as a simple eXtensible Markup Language (XML) file.

The model analyzer 203 is configured to receive a design model 211 representing the event-flow of the SUT 213 which the user creates in a file-base format (step 301). Based on the design model 211, the model analyzer 203 analyzes the model 211 towards the structure in terms of possible flows considering the various control and data elements (step 303). The model analyzer 203 computes the cyclomatic complexity for the coverage of the corresponding flows and data elements of a model 211 (step 305).

The SUT analysis report 215 lists the design of the architectural artifacts by the corresponding applied metrics, for example, to compute a total number of data elements within the design model. This is how statistical identification of the model 211 is performed.

The model analyzer 203 is configured to analyze the flows of the model 211 using static metrics such as data coverage in terms of augmented test artifacts (test data) and flow coverage in terms of different flows that can be taken through a design model represented by an activity diagram.

The model analyzer 203 computes test complexity based on the number of identified flows plus the test data within a model for the coverage of test data within flows, and applies various coverage criteria as a guideline to the user to decide the test case generation criteria to be selected. The test data represents a set of variations describing under which conditions the design model will be tested. The test complexity is the number of test cases required in order to cover all test variation data within the identified flows within the design model 211.

The test case generator 205 is configured to automatically derive test cases from the design model 211. The test case generator 205 is scalable through a combination of several available criteria for test data and flow coverage which is given by the user as test selection criteria 217.

The determined architectural artifacts of the design model 211, based on the analysis report 215, are input to the test case generator 205. The user selects and inputs test case selection criteria 217 for test case generation which generates individual test cases 219 based on the test selection criteria 217 (step 307).

Test case generation criteria 217 are pre-selected as the architectural choice for an adequate coverage of the underlying SUT and define a requirement that must be fulfilled by the generated test cases. For example, the criteria 217 may be to cover all of the test data within a design model 211. Then, the generated test cases must fulfill those criteria. Pre-selection is based on the static analysis of the design model 211. If the static analysis reveals that the design model 211 has many control elements such as decisions, but few events, then the selection criteria 217 would be to cover all combinations of in-going and out-going decision flows instead of events.

Test cases covering the predetermined architectural artifacts are generated (step 309). Among others, the test criteria for the generation of test artifacts (i.e., test cases) can include all-flows and all-events for the case of flow coverage and exhaustive, pair wise, data per flow and data per test case for the case of test data coverage. Intelligent filters can be applied to limit the number of test cases generated.

Test cases are statistically identified and their capability for the coverage of test data and flows is computed (step 311). Based on the test cases their content is analyzed to determine how well their test capability is in terms of how many different test input data variation and how many different flows of the design model those test cases are covering. The more data and flows each test case tests, the greater their capability is to detect faults.

The identified test data are weighted towards their coverage for selection (step 313). If it is seen that a certain test input data variation has a higher capability of finding defects than another test data, then that data can be weighted higher. This means that higher weighted test data are more likely to reveal defects than other data inputs. The analogy is true for flow coverage. The test case capability weights are set by the user. Those weights are given by the user's experience and knowledge of the SUT. The weighting is of refining the granularity within the test case selection criteria 217.

Based on the test selection criteria and the weighting of test data, the test cases are prioritized based on which test data have been used for the generation of the test case (step 315). The selection criteria ensure that test cases are generated according to the identified cyclomatic complexity of the system. The weighting ensures that those test cases are executed first which are more likely to detect faults because they are ranked with a higher defect detection capability. Thus, test case capability is the product of covered architectural artifacts and test data weights.

The test execution engine 207 executes the set of test cases in the initial priority order and collects their verdicts as pass/fail results until a failure. Additionally, the test execution engine 207 checks that the different test preconditions are fulfilled, such as the connection of the test system with the SUT. The test execution engine 207 can distinguish between known failures and new failures.

Each test case is executed by the test execution engine 207 which reveals defects in the SUT. Based on the test results, the initial test case execution order may be reprioritized (reordered) by the test execution engine 207.

The test cases are executed against the design model (step 317). When running a test, the test execution engine 207 stimulates the SUT with the events defined within a test case as input and expects a predetermined result. If an output value of the design model is the same as the expected value, the test case passes. Otherwise it fails.

Test cases that fail are detected during execution (step 319).

The test execution monitor 209 monitors the execution engine 207 while executing test cases against the design model 211. Once a failure is detected, the test execution monitor 209 suspends the execution engine 207 and reprioritizes unexecuted test cases in the test case set before a next test case execution.

The dependency between a failed test case and each remaining test case to be executed in the test case set is calculated (step 321). Based on the calculation, the unexecuted test cases are reprioritized based on their event sequences (step 323).

The dependency between two test cases is identified by their distance. The greater the distance the greater the dependency, i.e., the test case likelihood to reveal a different failure than the failed test case is lower than a test case that has a lower distance as it is supposed to discover other aspects of the system which have not been covered by the failed test case. Therefore, the remaining, unexecuted test cases are reprioritized in a way that the test case having the lowest distance has the highest priority.

Figure 4:
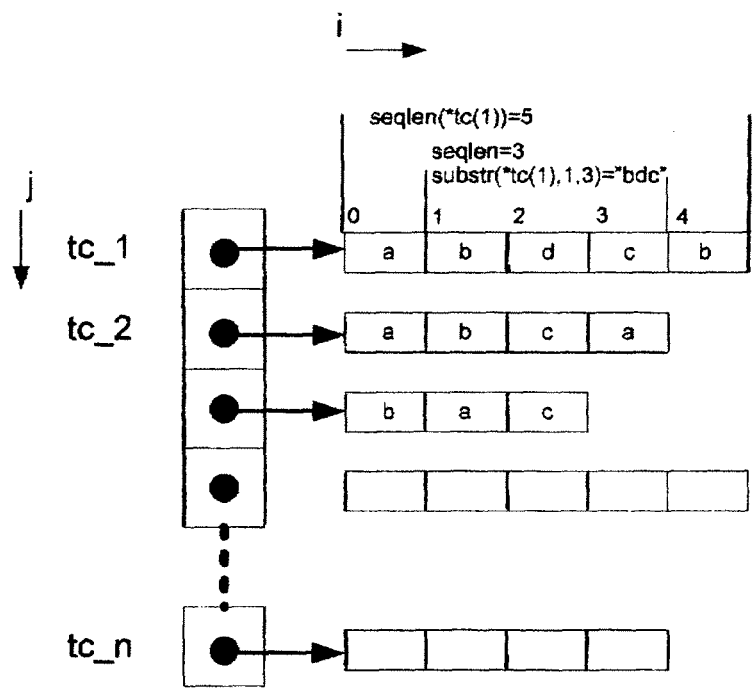
FIG. 4 is an exemplary unexecuted test case reprioritization method.

FIG. 4 shows the reprioritization method executed by the test execution monitor 209:

```
Input:    ARRAY tc_f[1..k]      // sequence of failed test case
          ARRAY *tc[1..n]       // ARRAY of test case pointer
Output:   ARRAY tc_prio[1..n] = { }  // list of reprioritized unexecuted
                                       test cases
01  INTEGER seqlen:=2;          // length of a sequence
02  UNTIL seqlen <= seqlen(tc_f)
03    FOR j:=1 TO n DO
04    BEGIN
05      FOR i:=1 TO seqlen(*tc(j)) DO
06      BEGIN
07        IF seqlen <= seqlen(*tc(j)) THEN
08        BEGIN
09          IF substr(tc_f,i,i+seqlen) = substr(*tc[j],i,i+seqlen) THEN
10            tc_prio[j] := tc_prio[j]+1;
11        END IF
12        i:=i+1;
13      END FOR
14      j:=j+1;
15    END FOR
16    seqlen := seqlen+1;
17  REPEAT
```

For a given (initial) test case order, the reprioritization method calculates the distances between a failed test case event sequence and the remaining, unexecuted test cases' event sequences.

The failed test case has a predefined event sequence of length k. For each event sequence length "seqlen" in the failed test case that is less than event sequence length k is identified. Starting with a minimal event sequence length of 2, the failed test case event sequence is analyzed to identify which of the unexecuted test cases have the same content.

The method examines each unexecuted test case to find if matching event sequences exist. Each event sequence within a test case is analyzed which explains the three loops within the algorithm. For each match that is found the distance "tc_prio" of the unexecuted test case where the match is found is increased by one. The function "substr" calculates the content of the test case for an identified event sequence. The function "seqlen" is the length of an event sequence.

Figure 5:
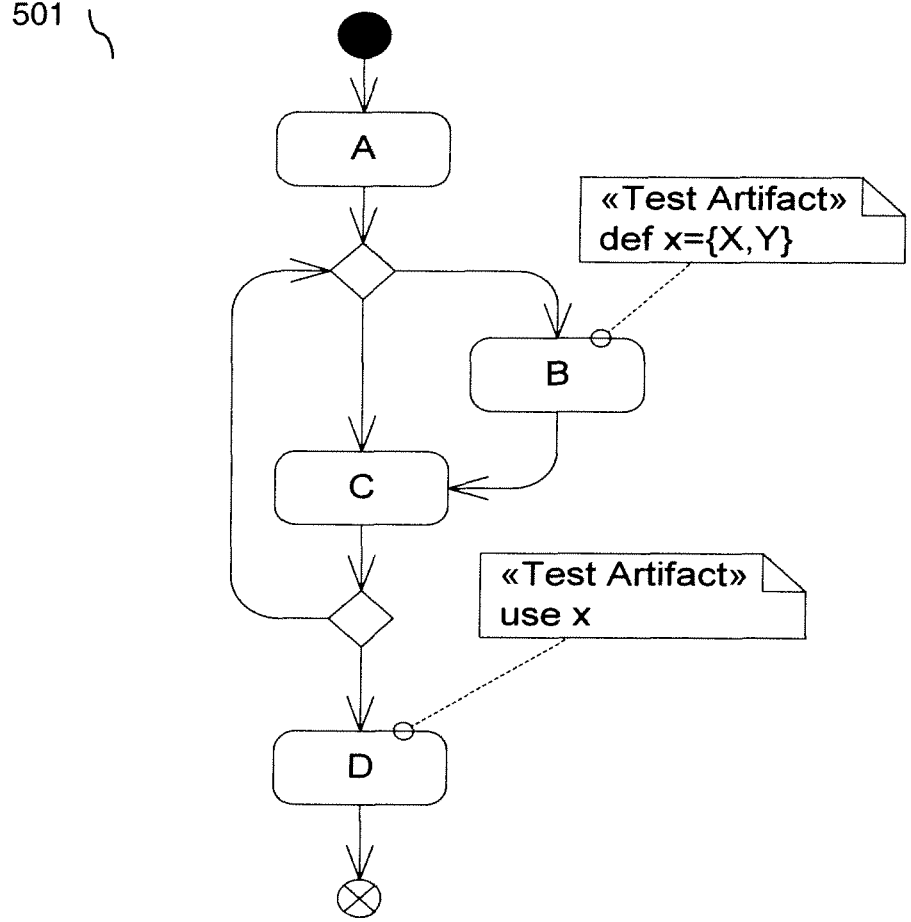
FIG. 5 is an exemplary event-flow diagram for an initial test case selection.
Figure 6:
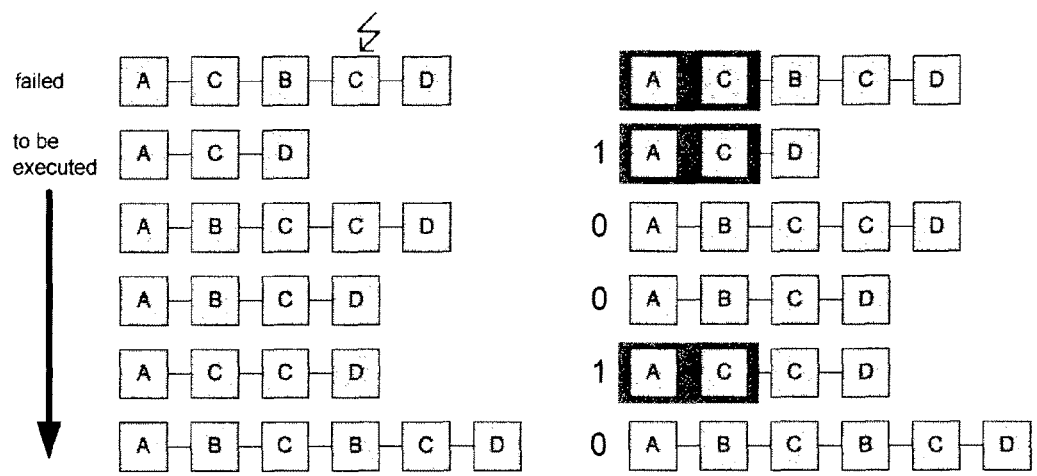
FIG. 6 (left) is an exemplary test case set for the event-flow diagram in FIG. 5 that comprises six test cases, each test case has a predefined event sequence and the first test case has experienced a failure when executed and (right) a distance calculation from the failed first test case to each unexecuted test case in the test case set for an event sequence length seqlen=2 (shaded).
Figure 7:
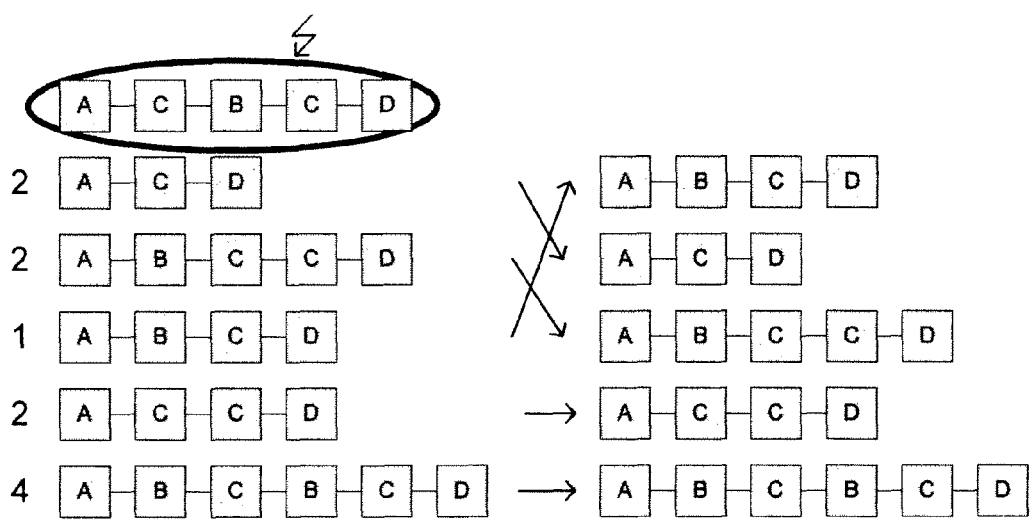
FIG. 7 (left) is the test case set in FIG. 6 with distance calculations based on event sequence lengths of seqlen=2, 3, 4 and 5 in the failed test case that matched with event sequence lengths found in the unexecuted test cases and (right) a reprioritization of the unexecuted test cases based on the distance calculations.

FIGS. 5, 6 and 7 show an example of unexecuted test case set reprioritization. FIG. 5 shows an exemplary design model 211 event-flow diagram 501. Flow complexity coverage is determined by the number of decisions (diamonds) contained within the event-flow diagram. Data complexity coverage is determined by the number of test input parameters (one) and their choices to be covered. The choices are determined by the different values the variable "x" can have. The event-flow diagram 501 flow complexity is two and the data complexity is one. Since flow complexity is greater than data complexity, the focus of test case generation should be on the flow coverage such that all different flows within design model event-flow are covered.

The event-flow diagram 501 has four events, A, B, C and D. A test input parameter x, where x={X,Y}, is defined and augmented to event B. Augmentation describes a relation to a model element, i.e., event, so properties can be associated with that model element. The user typically performs augmentation. <<test artifact>> def x is an example augmentation. "use x" indicates that the previously defined variable x is now reused in event B.

Parameter x can have two values, X or Y, which are later used in event D and two test cases are required to cover the data values. To cover the event flows, the values of parameter x require three test cases if the B→C loop is only repeated once. Therefore, the number of test cases needed to cover either data or event flow of the event-flow diagram 501 determines whether testing will focus on the coverage of flows or the coverage of data. Since testing effort in terms of the number of test cases needed to be executed for flow coverage is greater than for data coverage, testing focuses on flow coverage.

FIG. 6 (left side) shows a set of six test cases generated 205 for the event-flow diagram 501 from the selected flow coverage criteria. Each test case is a sequence of the four events A,B,C,D: A→C→B→C→D, A→C→D, A→B→C→C→D, A→B→C→D, A→C→C→D and A→B→C→B→C→D.

If the first test case event sequence A→C→B→C→D fails when executed, the failed test case is used to reorder the remaining unexecuted test cases. Continuing with the example, the first test case failed and has a sequence length seqlen=5. The failure was detected during the second execution of event C and is covered by a test case event sequence that can be either intrinsic or context sensitive.

An intrinsic failure is a failure that occurs each time the same event is executed independent of which event sequences precede it. A context sensitive failure is if a particular set of events has to be executed in order to trigger the defect, i.e., the defect is only covered if a particular sequence of events have been previously executed.

FIG. 6 shows a context sensitive failure.

In order to reprioritize the unexecuted test cases in the test case set based on their potential to detect a divergent fault, not only does the similarity of an unexecuted test case to the failed test case need to be identified by each individual event but also by the different lengths of test case event sequences that the failed and unexecuted test cases have in common. Therefore, for each failed test case event sequence of length seqlen, it is compared with the remaining unexecuted test cases to identify if the same event sequences are present.

FIG. 6 (right side) shows that an seqlen=2 event sequence A→C (bolded) is present in the second A→C→D and fifth A→C→C→D unexecuted test cases. The number left of each test case (1, 0, 0, 1, 0) represents the number of times an unexecuted test case includes the event sequence A→C. The second test case A→C→D and fifth test case A→C→C→D of the set each include one instance of event sequence A→C. The next event sequence of the failed test case for seqlen=2, C→B, is examined similarly, followed by B→C, C→D, for seqlen=3: A→C→B, C→B→C, B→C→D, for seqlen=4: A→C→B→C, C→B→C→D and for seqlen=5 A→C→B→C→D.

FIG. 7 (left side) shows the results of all failed test case event sequence lengths of 2, 3, 4 and 5 that match like event sequences found in the unexecuted test cases. The number left of each unexecuted test case (2, 2, 1, 2, 4) represents the total number of event sequences in those test cases that are in common with the event sequences in the failed test case. The number represents their distance.

Depending on the result of the distance calculation between a failed test case and remaining unexecuted test cases, the unexecuted test cases are reordered so that a test case that has the smallest number of common event sequences is executed next. FIG. 7 (right side) shows the results of unexecuted test case reordering. The likelihood is less that the next executed test case will fail because of the same reason the previous test case failed and the likelihood to detect a divergent failure within the design model is greater.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for dynamically reprioritizing unexecuted test cases in a test case set for a Model-Based Testing (MBT) System Under Test (SUT) design model during test case execution comprising:
    inputting a design model representing the SUT as an event-flow;
    analyzing the design model structure in terms of possible event-flows considering the design model's control and data elements;
    computing test complexity for the coverage of the event-flows and control and data elements;
    selecting test case generation criteria for a desired test objective;
    generating a plurality of test cases based on the test case selection criteria wherein each test case is an event sequence;
    computing test case capability for the coverage of event-flows and data wherein the more data and flows each test case tests, the greater their capability is to detect faults;
    weighting identified test data towards their coverage for selection;
    prioritizing the test cases based on the test selection criteria and the weighting of test data;
    executing the test cases in their priority against the model;
    detecting if a test case failed during execution;
    calculating a distance between a failed test case and each remaining test case to be executed; and
    based on the distance calculation for each unexecuted test case, executing the test case having the greatest distance.

2. The method according to claim 1 wherein the design model is an XML file.

3. The method according to claim 1 wherein the design model is an activity diagram.

4. The method according to claim 1 wherein test complexity is the complexity to test the model.

5. The method according to claim 4 wherein the test complexity is based on the number of identified flows plus the test data within the design model for the coverage of test data within the flows, and further comprises applying various coverage criteria to decide the test case generation criteria to be selected.

6. The method according to claim 5 wherein the test data represents a set of variations describing under which conditions the design model is tested.

7. The method according to claim 1 wherein calculating the distance between a failed test case and each remaining test case to be executed further comprises:
    parsing the failed test case event sequence length k into a plurality of event sequences having an event sequence length seqlen from 2 to the failed test case event sequence length k, wherein the parsed event sequences comprise the failed test case event sequences in their original order;
    comparing each failed test case parsed event sequence with each remaining unexecuted test case event sequence;
    identifying if a failed test case parsed event sequence is present in any of the unexecuted test cases; and
    for each unexecuted test case, summing the number of failed test case parsed event sequence matches as a distance.

8. The method according to claim 7 wherein executing the test case having the greatest distance comprises executing the unexecuted test case that has the smallest number of failed test case parsed event sequence matches.

9. A system for dynamically reprioritizing unexecuted test cases in a test case set for a Model-Based Testing (MBT) System Under Test (SUT) design model during test case execution comprising:
    means for inputting a design model representing the SUT as an event-flow;
    means for analyzing the design model structure in terms of possible event-flows considering the design model's control and data elements;
    means for computing test complexity for the coverage of the event-flows and control and data elements;
    means for selecting test case generation criteria for a desired test objective;
    means for generating a plurality of test cases based on the test case selection criteria wherein each test case is an event sequence;
    means for computing test case capability for the coverage of event-flows and data wherein the more data and flows each test case tests, the greater their capability is to detect faults;
    means for weighting identified test data towards their coverage for selection;
    means for prioritizing the test cases based on the test selection criteria and the weighting of test data;
    means for executing the test cases in their priority against the model;
    means for detecting if a test case failed during execution;
    means for calculating a distance between a failed test case and each remaining test case to be executed; and
    based on the distance calculation for each unexecuted test case, means for executing the test case having the greatest distance.

10. The system according to claim 9 wherein the design model is an XML file.

11. The system according to claim 9 wherein the design model is an activity diagram.

12. The system according to claim 9 wherein test complexity is the complexity to test the model.

13. The system according to claim 12 wherein the test complexity is based on the number of identified flows plus the test data within the design model for the coverage of test data within the flows, and further comprises applying various coverage criteria to decide the test case generation criteria to be selected.

14. The system according to claim 13 wherein the test data represents a set of variations describing under which conditions the design model is tested.

15. The system according to claim 9 wherein means for calculating the distance between a failed test case and each remaining test case to be executed further comprises:
    means for parsing the failed test case event sequence length k into a plurality of event sequences having an event sequence length seqlen from 2 to the failed test case event sequence length k, wherein the parsed event sequences comprise the failed test case event sequences in their original order;
    means for comparing each failed test case parsed event sequence with each remaining unexecuted test case event sequence;
    means for identifying if a failed test case parsed event sequence is present in any of the unexecuted test cases; and
    for each unexecuted test case, means for summing the number of failed test case parsed event sequence matches as a distance.

16. The system according to claim 15 wherein means for executing the test case having the greatest distance comprises means for executing the unexecuted test case that has the smallest number of failed test case parsed event sequence matches.

* * * * *